Patented Apr. 22, 1947

2,419,512

UNITED STATES PATENT OFFICE 2,419,512

PROCESS FOR PRODUCING PIGMENTED RUBBER

Vincent C. Vesce, Ridgewood, N. J., assignor to Harmon Color Works, Inc., Paterson, N. J., a corporation of Ohio No Drawing. Application February 8, 1944, Serial No. 521,744

7 Claims. (Cl. 260—41)

This invention is concerned with rubber processing, and is particularly concerned with the preparation of a carbon black pigmented rubber particle or aggregates thereof, for use in the construction of such articles of manufacture as automobile tires, inner tubes, rubber gloves, erasers, etc.

According to the Baruch report of September 10, 1942, the tread wear of Buna S (copolymerized butadiene and styrene) tires is only about 90% as good as natural rubber tires; that of "neoprene" synthetic rubber tires about 90% as good at normal speeds and 125% as good under severe service; that of "Butyl" synthetic rubber tires about 40 to 50%; that of "Thiokol" synthetic rubber tires about 20%; and that of reclaim rubber about 20 to 25%. Also according to the same report, the manufacturing efficiency for mixing synthetic rubber is only 40 to 70% that of natural rubber compounds.

In the rubber industry, one of the most widely used procedures for improving the tread wear of automobile tires is to reinforce the rubber by incorporating carbon black therein. The incorporation of the carbon black, however, presents many difficulties. In the case of natural rubber the rate at which the rubber takes up the carbon black is very slow, long mastication is necessary to obtain good dispersion of the gas black in the rubber and the plasticity of the resulting composition is much less than that of the original rubber. Although the present methods of incorporating carbon black into natural rubber have been carefully worked out over a long period of time, the method is both expensive and requires careful control and considerable processing equipment and labor. All the difficulties met in the incorporation of carbon black into natural rubber have been greatly increased in substituting synthetic rubbers for natural rubber. Specifically in the case of GRS much difficulty has been experienced both in plasticizing the crude rubber to prepare it for black incorporation, as well as obtain a good dispersion of black in the broken down rubber. That this is a serious factor is well illustrated by the various reports of the rubber director in which fear is expressed that the additional processing equipment required to handle GRS over that required for natural rubber will seriously endanger our rubber program because of machine limitations.

One object of the present invention is to improve the processing of synthetic rubber products, particularly those reinforced with carbon black.

Another object of the invention is to decrease substantially the time, labor, and power required to "mill" or incorporate the carbon black into rubber, without adversely affecting the physical characteristics of the rubber.

Another object is to convert under controlled conditions a freshly prepared dispersion of carbon black into a suspension of nascent finely divided carbon black particles of substantially uniform and predetermined size.

Another object is to prevent premature complete coagulation of rubber latex upon addition of the nascent finely divided carbon black particles thereto.

A specific object is to provide a spongy curd of carbon black pigmented rubber granules wherein the carbon black particles are nuclei covered substantially completely with films of coagulated latex.

A further specific object of the invention is to utilize the benefits of a dispersing and wetting agent in preparing a carbon black dispersion while avoiding the disadvantages arising under normal conditions from the presence of a dispersing and wetting agent in the carbon black pigmented rubber product.

According to my invention, carbon black is converted into a true colloidal dispersion from about 10 to 30%, by weight, or more, strength in water by means of a suitable dispersing agent and suitable mixing; the rather viscous fluid dispersion is diluted with water to a 5, 15, or 20%, by weight, carbon black content; the diluted dispersion is flocculated into a suspension of finely divided nascent carbon black particles by means of a suitable flocculating agent which also nullifies the dispersing activity of the dispersing agent; the suspension of carbon black particles is pretreated with a suitable reagent to inhibit their tendency to produce premature coagulation of rubber latex; the suspension of carbon black particles is combined with rubber latex; and after mixing until the carbon black particles are uniformly surrounded with rubber latex the mixture is treated with suitable agents causing the coagulation of the rubber latex.

The term dispersing agent is used in accord with its true meaning as described in the publication of F. K. Daniel in the India Rubber World, volume 101, #3 of December, 1939, namely, a surface active agent capable of reducing the adhesion forces between the carbon particles to at least a certain critical value at which the Brownian movement becomes equal to or stronger than adhesion. On the other hand, a wetting agent is a material which is soluble in water and which in small quantities will materially reduce the surface tension of water. Suitable dispersing agents are condensation products formed by reacting formaldehyde with naphthalene sulfonic acid; purified sulfolignins; and water soluble extracts of natural tannin type glucosides, such as quebracho extracts. I prefer especially non-foaming dispersing agents having also a substantial wetting action, such as the condensation products of formaldehyde with naphthalene sulfonic acids. Protective colloids, such as glue and casein, may also be used under conditions that they behave as dispersing agent. A flocculating agent is substantially the opposite of a dispersing agent, that is, it is an agent which reinstates the adhesive forces between the dispersed carbon black particles thereby causing the particles only to flocculate.

The following examples serve to illustrate specifically the invention.

Example 1

Seven hundred and seventy-five grams of carbon black of a channel black type (Binney and Smith's "Micronex" #w–6 beads) is added at room temperature to 1550 grams of water containing 77.5 grams of Chemical PW (the disodium form of the condensation product of formaldehyde and a naphthalene sulfonic acid). After the carbon black is thoroughly wetted, the mixture is homogenized by passage through a colloid mill. The resulting dispersion containing about 33% of carbon black particles is placed in a suitable vessel and diluted with sufficient water to bring the total volume to 16 liters. To this dilute dispersion is added 38 grams of Turkey red oil as a wetting agent and flocculation assistant to ensure uniformity and facilitate control of the size and nature of the particle during flocculation; and with agitation a solution of 100 grams of barium chloride in water is added to flocculate the carbon black dispersion to a suspension of well flocculated, very finely divided nascent carbon black particles substantially free from aggregates. In the case of flocculating agents of the character of barium chloride, the use of Turkey red oil or similar flocculation assistant is especially advantageous. Before flocculation the diluted dispersion may be passed through relatively fine texture filter paper without removing any carbon particles while after flocculation a spot test on filter paper shows a sharply defined demarcation between the flocculated carbon black and the liquid of the suspension. It is to be noted that the barium chloride not only causes flocculation of the carbon black particles but also insolubilizes the dispersing agent. The excess of barium chloride is converted to barium sulfate by adding with agitation to the suspension of carbon black a solution of 200 grams of alum dissolved in water. The resulting aluminium chloride, as well as any other water-soluble aluminium salts is in turn converted to aluminium hydroxide by addition of a solution of 100 grams of sodium carbonate in water, thereby bringing the pH to a value between 6 to 7. To the suspension of carbon black particles is now added an emulsion of 155 grams of "Apco" thinner, which is a petroleum hydrocarbon liquid immiscible with water and boiling over a narrow range. The suspension of carbon black is now in condition for the addition of 6900 grams of a synthetic rubber latex, such as the copolymerization product of butadiene and styrene, known as Buna S and as GRS, and containing 25% solid polymer. A heavy creaming or increase in viscosity occurs upon mixing the synthetic rubber latex with the suspension of carbon particles. A test shows that the synthetic rubber latex emulsion persists at this point. After stirring the carbon black suspension uniformly into the latex emulsion, a solution of 350 grams of aluminium sulfate dissolved in 3500 cc. of water is used to coagulate the synthetic rubber latex. The precipitate is distinctly grayish black in character, has a pH value between 3.4 and 4.5, and consists of uniform pigmented rubber particles which are readily filtered, washed thoroughly, pressed and/or dried to any desirable moisture content such as about 5% or lower, but not completely dried. By virtue of the use of the solvent such as "Apco" thinner, there results a pigmented rubber particle in which a residual solvent and/or moisture is distributed evenly throughout the mass. The pigmented rubber particles apparently consist of carbon black nuclei covered substantially completely with continuous films of coagulated latex. The grayish black appearance of the freshly coagulated pigmented rubber particles is probably sufficient proof that such is the nature of the pigmented synthetic rubber particles, but further proof lies in the fact that the pigmented rubber particles can be rubbed between the hands and no carbon black as such appears on the hands. Upon standing and drying, the pigmented rubber particles become blacker in color and substantially no carbon black comes off upon rubbing against white paper. The pigmented rubber contains about 31% of carbon black. Because of the remarkable degree and uniformity of the dispersion and the uniform distribution of the carbon black within the coagulated rubber, a good smooth homogeneous dispersion is readily and quickly obtained when the pigmented rubber particles are masticated on the milling rolls, and with less expenditure of mechanical energy. A distinct increase in the manufacturing efficiency for mixing rubber is thereby achieved. Fortunately also, this increase in manufacturing efficiency is secured without any impairment of the physical characteristics of the synthetic rubber sheet resulting from the milling operation or the products made from the rubber sheet.

In the above example, the use of the "Apco" thinner ensures that the nascent carbon black particles become hydrophobic in character and also provides the suspended rubber carbon particles with a film of protective volatile liquid which remains thereon until all the water has been evaporated in the final drying step, if it is desired to dry completely the particle.

Example 2

The same procedure is followed as in Example 1, except the "Apco" thinner is omitted. The freshly coagulated carbon black pigmented synthetic rubber particles appear not quite as gray as the product secured with "Apco" thinner present. The coagulated uniform pigmented rubber particles are thoroughly washed.

Example 3

The same procedure is followed as in Example 1, up to and including the addition of Turkey red oil to the diluted carbon black dispersion. The dispersion is flocculated to a suspension of finely divided uniform nascent carbon black particles by addition of a solution of 50 grams of aluminum sulfate in water. A spot test on filter paper shows a sharply defined demarcation between the flocculated carbon black and the suspending liquid medium. 25 grams of sodium carbonate dissolved in water is added to bring the suspension to a pH of 6 to 7 and to insolubilize any soluble aluminum salt present. To the thus prepared carbon black suspension, is added with suitable agitation 6900 grams of synthetic rubber latex of the Buna S type containing about 25% of solid butadiene-styrene copolymer. A slight creaming or increase in viscosity is observed at this point, but it is much less than in the case of Example 1. After thorough mixing of the carbon black suspension into the synthetic rubber latex, coagulation of the synthetic rubber latex is brought about by treatment with a solution of 350 grams of aluminum sulfate in 3500 cc. of water. The resulting precipitate consists of a spongy mass of fine non-crocking carbon black pigmented rubber particles which are readily filtered, washed thoroughly and dried.

Example 4

The same procedure is followed as in Example 1, except the homogenization of the carbon black dispersion is accomplished by means other than a colloid mill, for example by means of ball mills, milling rolls, or Werner Pfleiderer kneaders, or "Lightning" type propeller stirrers.

Example 5

The same procedure is performed as in Example 1, except instead of "Chemical PW," "Hornkem #12" is used as the dispersing agent. "Hornkem #12" is a water-soluble extract of a natural glucoside product.

For the purposes of my invention, I prefer to use a channel gas type of carbon black. However, other varieties of carbon black, such as gas black, impingement black, thermal decomposition carbons, furnace blacks, and acetylene carbon black can be used with advantage.

As wetting agents any of the anionic or cationic types may be employed; precautions being taken that the amount and type of the wetting agent selected does not cause premature complete coagulation of the synthetic rubber latex. Suitable anionic types of wetting agents are Turkey red oil, soluble pine oil, the diamyl ester of sodium sulfo succinic acid, sulfated glycerylamide, water soluble soaps such as sodium oleate, alkyl naphthalene sodium sulfonate, such as are sold in the trade under the names of "Nekal A" and "Nekal BX" and laurylsulfate and other sulfates of higher aliphatic alcohols, such as are sold under the name of "Duponols." Suitable cationic types of wetting agents are the substituted quaternary ammonium compounds, such as "Triton"-K-60 (cetyl methyl dibenzyl ammonium chloride), "Product Q" (cetyl trinethyl ammonium bromide), "Onyxsen C," and other compounds such as those described in U. S. Patents 2,206,928, 2,187,823, 2,192,956, 2,282,006, and Reissue 21,530.

I prefer to flocculate the carbon black dispersions with a polyvalent salt such as barium chloride or aluminum sulfate but most any salt electrolyte will serve to bring about flocculation. Thus one may use sodium aluminate, sodium zincate, sodium stannate, sodium silicofluoride, zinc chloride, magnesium chloride, calcium chloride, aluminium acetate, lead subacetate, zinc acetate, magnesium acetate, calcium acetate, etc. Likewise cationic reagents are useful to bring about flocculation of the carbon blank dispersion if the dispersion has been prepared with an anionic type of dispersing agent. Primary aromatic amine hydrochlorides or other water-soluble salts thereof may also be used to bring about flocculation.

I prefer for best results to coagulate the synthetic rubber latex by means of a solution of aluminium sulfate. However the coagulation may also be achieved by means of other salts alone or in combination with certain acids and/or salts. Thus an aqueous solution of sodium chloride, alum, and sulfuric acid serves quite well to coagulate the synthetic rubber latex. Other suitable coagulating combinations are sodium chloride and aluminium chloride; sodium sulfate, aluminum sulfate, and sulfuric acid; and sodium acetate, aluminum acetate, and acetic acid. Other single coagulating agents are barium chloride, aluminum chloride, zinc acetate, zinc chloride, zinc sulfate, magnesium acetate, magnesium chloride, magnesium sulfate, aluminum acetate, calcium chloride, lead subacetate, etc. If an acid is present in the coagulating solution, the final pH should be balanced around a value of 3.5 to 5 to prevent regeneration of the dispersing agent into a soluble form, unless the regenerated dispersing agent is one that may be readily removed by water washing in the presence of barium and/or aluminum salts.

The most striking advantages of the present invention occur in the case of synthetic rubber, particularly that known as Buna S. The teachings of the present invention however may also be applied with advantage to treating latex from other synthetic rubbers, such as Buna N (copolymers of butadiene and acrylonitrile), "Neoprene" (polymerized chloroprenes), and any other synthetic rubber obtainable in the form of a latex. Likewise the invention may be applied with some advantage to the treatment of a natural rubber latex.

In the initial dispersion step I prefer to make a dispersion of as high a carbon black content as possible while retaining sufficient flow fluidity to permit the dispersion to be pumped. For the purpose of the invention I may make by my procedure strong dispersions containing as much as 40 to 50% or more carbon black. Using such a high concentration of carbon black seems to facilitate the preparation of an excellent dispersion. In fact I have found the carbon black may be prepared in so strong, smooth and fluid a dispersion by virtue of mixing the carbon black with water in the presence of a dispersing agent, that the same amount of carbon black in the same amount of water alone or with the same amount of dispersing agent alone would appear to be completely dry.

For imparting a hydrophobic character to the carbon black particle while also protecting the same with a protective film of volatile liquid until the final drying step, I may substitute effectively in place of the Apco thinner, various other volatile water-immiscible liquids. A few that may be mentioned for illustrative purposes are benzene, Stoddard's solvent, toluol, n-butyl alcohol and higher liquid aliphatic alcohols, trichlorethylene, ethylene dichloride, carbon tetrachloride, turpentine, xylol, terpenes, pinenes, tetralin, decalin, and cyclohexene.

Sometimes it is desired to have the dry crude rubber contain softeners and/or plasticizers and various additional substances which would ordinarily be later incorporated into rubber during mill, Banbury, or other type mixing. These softeners include those ordinarily used, such as rosin derivatives, pine tar and pine tar derivatives, asphalt base softeners, various rubber softeners made from coal tar, such as coumarone-indene resins, etc.

While I have discussed the invention mainly in terms of carbon black, still the teachings of the invention obviously may be practiced with advantage to the incorporation of other prime, reenforcing and extender pigments. Among such pigments may be mentioned, zinc oxides, titanium dioxide, lithopone, whitings, clays, blanc fixe, hydrated alumina, precipitated calcium carbonates, iron oxides, ochres, ultramarine blue, cadmium reds, cadmium yellows, benzidene yellows, Hansa yellows, phthalocyanines, indanthrene vat pigment dyes, toluidine reds, and other pigments described in chapter 1, entitled "Classification of pigments," of volume II of J. J. Mattiello's book "Protective and Decorative Coatings," published 1943 by John Wiley & Sons, Inc. In all such cases the control flocculation of a colloidal aqueous dispersion to produce a suspension of finely divided nascent pigment flocculates, insures after distribution into the latex nuclei for envelopment by the rubber during coagulation.

By following the process of the invention, one is able to decrease the milling time one-third to one-half or more. As a consequence less equipment, labor and power are required to accomplish the milling operation. Dusting during the compounding operation is also eliminated. Moreover, one is able to use by the process of the invention highly cross-linked polymerized material that is not readily compounded by conventional milling or that requires such extensive milling that the physical properties are destroyed.

I claim:

1. A process for producing non-crocking pigmented rubber particles comprising converting a pigment into a colloidal dispersion by the addition of water and a dispersing agent to the pigment, adding a water-soluble polyvalent metal salt to flocculate the dispersion into a suspension of finely divided pigment particles and render the dispersing agent substantially completely inactive, adjusting the pH of the suspension to substantially 6 to 7, mixing the suspension with a latex selected from the group consisting of natural rubber, polymerized chloroprene and synthetic rubbery polymers of a butadiene hydrocarbon; and finally coagulating the mixture to produce coagulated pigmented rubbery particles.

2. A process for producing non-crocking pigmented rubber particles comprising converting a pigment into a colloidal dispersion by the addition of water and a dispersing agent to the pigment, adding a water-soluble polyvalent metal salt to flocculate the dispersion into a suspension of finely divided pigment particles and render the dispersing agent substantially completely inactive, adjusting the pH of the suspension to substantially 6 to 7, mixing the suspension with a natural rubber latex and finally coagulating the mixture to produce coagulated pigmented rubbery particles.

3. A process for producing non-crocking pigmented rubber particles comprising converting a pigment into a colloidal dispersion by the addition of water and a dispersing agent to the pigment, adding a water-soluble polyvalent metal salt to flocculate the dispersion into a suspension of finely divided pigment particles and render the dispersing agent substantially completely inactive, adjusting the pH of the suspension to substantially 6 to 7, mixing the suspension with a polymerized chloroprene latex and finally coagulating the mixture to produce coagulated pigmented rubbery particles.

4. A process for producing non-crocking pigmented rubber particles comprising converting a pigment into a colloidal dispersion by the addition of water and a dispersing agent to the pigment, adding a water-soluble polyvalent metal salt to flocculate the dispersion into a suspension of finely divided pigment particles and render the dispersing agent substantially completely inactive, adjusting the pH of the suspension to substantially 6 to 7, mixing the suspension with a synthetic rubbery polymer of a butadiene hydrocarbon latex and finally coagulating the mixture to produce coagulated pigmented rubbery particles.

5. A process for producing non-crocking pigmented rubber particles comprising converting a pigment into a colloidal dispersion by the addition of water and a dispersing agent to the pigment, adding a water-soluble polyvalent metal salt to flocculate the dispersion into a suspension of finely divided pigment particles and render the dispersing agent substantially completely inactive, adjusting the pH of the suspension to substantially 6 to 7, mixing the suspension with a butadiene-styrene copolymer latex and finally coagulating the mixture to produce coagulated pigmented rubbery particles.

6. A process for producing non-crocking pigmented rubber particles comprising converting carbon black into a colloidal dispersion by the addition of water and a dispersing agent to the carbon black, adding a water-soluble polyvalent metal salt to flocculate the dispersion into a suspension of finely divided carbon black particles and render the dispersing agent substantially completely inactive, adjusting the pH of the suspension to substantially 6 to 7, mixing the suspension with a latex selected from the group consisting of natural rubber, polymerized chloroprene and synthetic rubbery polymers of a butadiene hydrocarbon; and finally coagulating the mixture to produce coagulated carbon black pigmented rubbery particles.

7. A process for producing non-crocking pigmented rubbery particles comprising converting an organic pigment into a colloidal dispersion by the addition of water and a dispersing agent to the organic pigment, adding a water-soluble polyvalent metal salt to flocculate the dispersion into a suspension of finely divided organic pigment particles and render the dispersing agent substantially completely inactive, adjusting the pH of the suspension to substantially 6 to 7, mixing the suspension with a latex selected from the group consisting of natural rubber, polymerized chloroprene and synthetic rubbery polymers of a butadiene hydrocarbon and coagulating the mixture to produce coagulated pigmented rubbery particles.

VINCENT C. VESCE.

REFERENCES CITED

The following references are of record in the file of this patent:

UNITED STATES PATENTS

| Number | Name | Date |
| --- | --- | --- |
| 2,354,424 | Novotny et al. | July 25, 1944 |
| 2,229,534 | Walton | Jan. 21, 1941 |
| 1,623,517 | Acheson | Apr. 5, 1927 |

FOREIGN PATENTS

| Number | Country | Date |
| --- | --- | --- |
| 368,256 | British | Feb. 29, 1932 |